(12) United States Patent
Stimpson

(10) Patent No.: US 9,044,374 B1
(45) Date of Patent: Jun. 2, 2015

(54) ASSISTED WALKING DEVICE

(71) Applicant: Leon E. Stimpson, Oakland Park, FL (US)

(72) Inventor: Leon E. Stimpson, Oakland Park, FL (US)

( * ) Notice: Subject to any disclaimer, the term of this patent is extended or adjusted under 35 U.S.C. 154(b) by 60 days.

(21) Appl. No.: 13/935,863

(22) Filed: Jul. 5, 2013

(51) Int. Cl.
*G01C 21/34* (2006.01)
*A61H 3/06* (2006.01)

(52) U.S. Cl.
CPC ............... *A61H 3/061* (2013.01); *G01C 21/34* (2013.01); *G01C 21/3423* (2013.01)

(58) Field of Classification Search
None
See application file for complete search history.

(56) References Cited

U.S. PATENT DOCUMENTS

| 2,593,026 | A | * | 4/1952 | Hawkins | 135/66 |
| 3,669,133 | A | * | 6/1972 | Hyman | 135/74 |
| D242,880 | S | | 12/1976 | Rex, Jr. | |
| 4,253,478 | A | * | 3/1981 | Husa | 135/68 |
| 5,097,856 | A | | 3/1992 | Chi-Sheng | |
| 5,687,136 | A | | 11/1997 | Borenstein | |
| 5,973,618 | A | | 10/1999 | Ellis | |
| 6,208,934 | B1 | * | 3/2001 | Bechtolsheim et al. | 701/428 |
| 7,043,364 | B2 | * | 5/2006 | Scherzinger | 701/470 |
| 8,812,231 | B1 | * | 8/2014 | Brickous | 701/488 |
| 2003/0009281 | A1 | * | 1/2003 | Whitham | 701/211 |
| 2005/0117952 | A1 | * | 6/2005 | Damery et al. | 400/109 |
| 2006/0280294 | A1 | * | 12/2006 | Zhang | 379/52 |
| 2007/0023072 | A1 | * | 2/2007 | Agnello et al. | 135/65 |
| 2008/0070201 | A1 | * | 3/2008 | Kwon et al. | 434/113 |
| 2008/0095576 | A1 | * | 4/2008 | Donald et al. | 404/34 |
| 2008/0251110 | A1 | * | 10/2008 | Pede | 135/66 |
| 2010/0182242 | A1 | * | 7/2010 | Fields et al. | 345/169 |
| 2011/0046876 | A1 | * | 2/2011 | Pan et al. | 701/201 |
| 2011/0054773 | A1 | | 3/2011 | Chi et al. | |
| 2011/0137437 | A1 | * | 6/2011 | Jonsson | 700/94 |
| 2012/0268563 | A1 | * | 10/2012 | Chou et al. | 348/46 |
| 2012/0279539 | A1 | * | 11/2012 | Kim | 135/66 |
| 2013/0218456 | A1 | * | 8/2013 | Zelek et al. | 701/412 |
| 2013/0253818 | A1 | * | 9/2013 | Sanders et al. | 701/419 |
| 2013/0327367 | A1 | * | 12/2013 | Lindsay et al. | 135/66 |

FOREIGN PATENT DOCUMENTS

WO WO2013/020861 A1 * 2/2013 ............... A45B 9/00

* cited by examiner

*Primary Examiner* — Calvin Cheung

(57) ABSTRACT

An assisted walking device assists a visually impaired person by providing audible directions to guide a user to a particular destination while also notifying the user of obstacles. The device includes an elongated shaft and a processor mounted in the shaft. A global positioning system ("GPS") is electrically coupled to the processor wherein the GPS is configured to provide orientation and directional data to the processor. A database has a mapped terrain and is operationally coupled to the GPS wherein the database compares the mapped terrain to the data provided by the GPS. An input actuator is electrically coupled to the processor and the GPS and is actuated to selectively choose a destination point. A speaker is electrically coupled to the processor, the GPS, and the database wherein the speaker is configured to transmit as voice messages the data from the GPS and the corresponding data from the database.

1 Claim, 3 Drawing Sheets

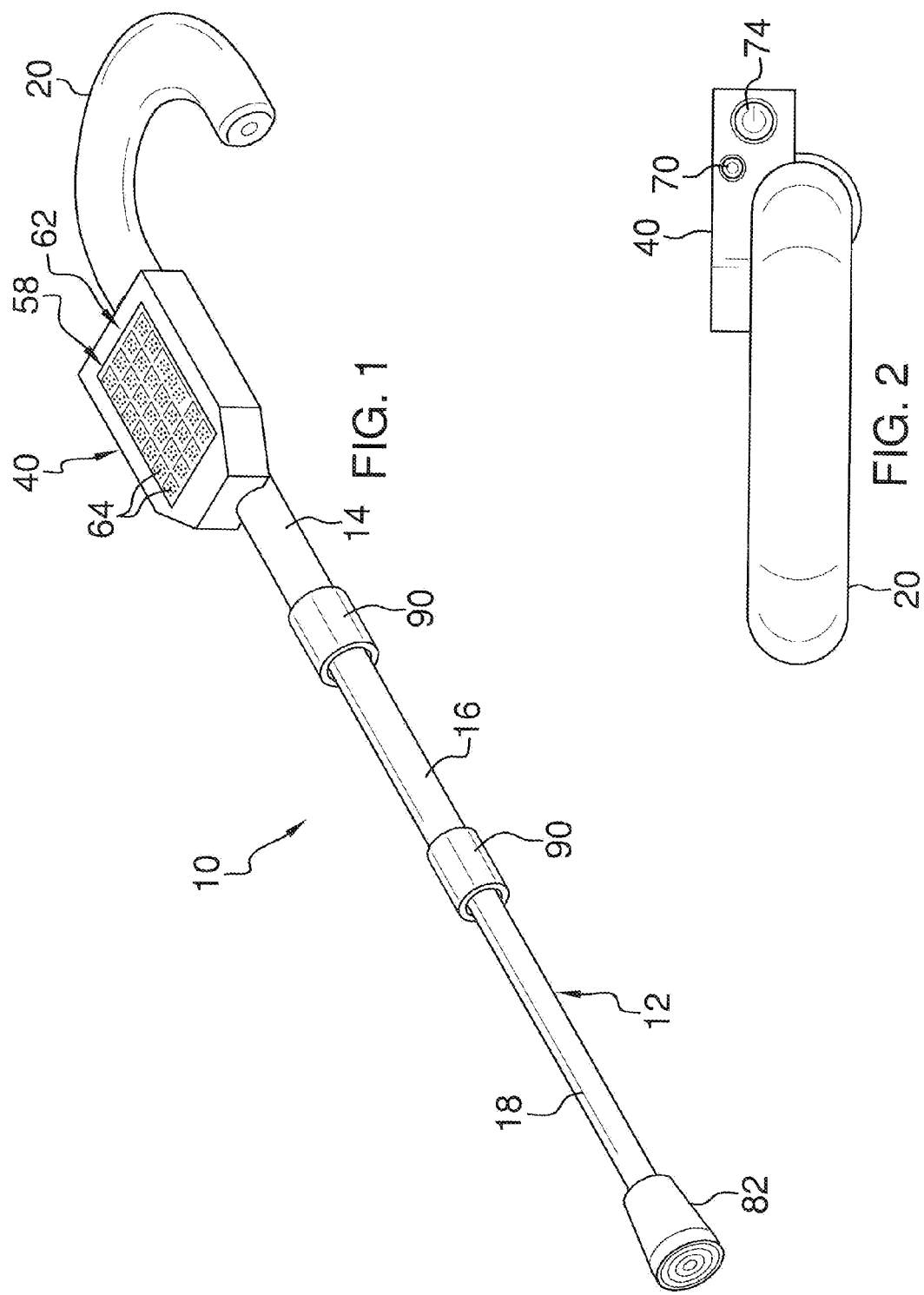

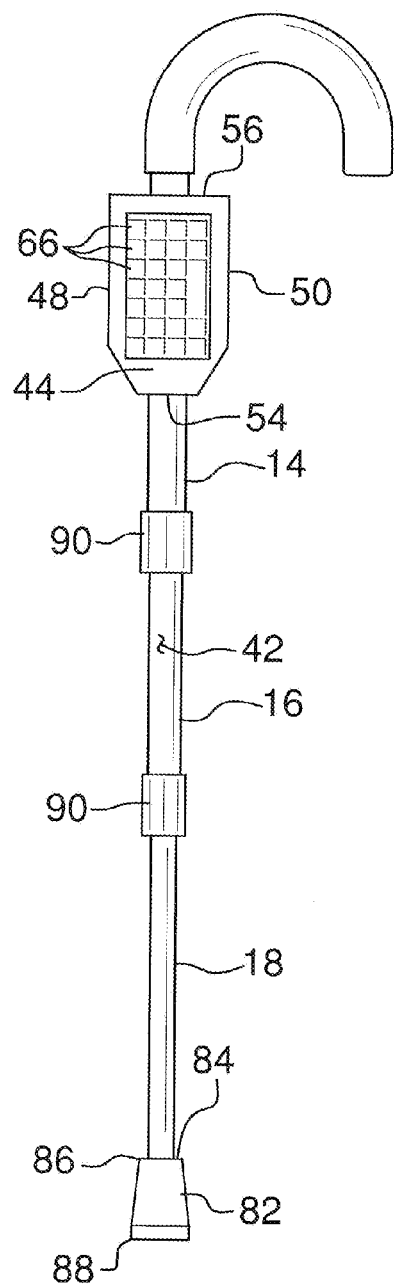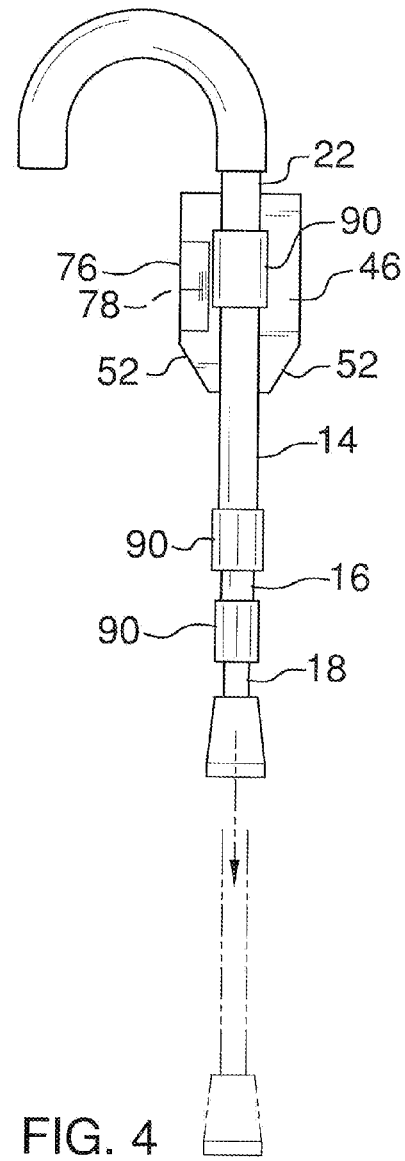
FIG. 3
FIG. 4

ASSISTED WALKING DEVICE

BACKGROUND OF THE DISCLOSURE

Field of the Disclosure

The disclosure relates to walking devices and more particularly pertains to a new walking device for assisting a visually impaired person by providing audible directions to guide a user to a particular destination while also notifying the user of obstacles.

SUMMARY OF THE DISCLOSURE

An embodiment of the disclosure meets the needs presented above by generally comprising an elongated shaft and a processor mounted in the shaft. A global positioning system ("GPS") is electrically coupled to the processor wherein the GPS is configured to provide orientation and directional data to the processor. A database has a mapped terrain and is operationally coupled to the GPS wherein the database compares the mapped terrain to the data provided by the GPS. An input actuator is electrically coupled to the processor and the GPS and is actuated to selectively choose a destination point. A speaker is electrically coupled to the processor, the GPS, and the database wherein the speaker is configured to transmit as voice messages the data from the GPS and the corresponding data from the database.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of an assisted walking device according to an embodiment of the disclosure.

FIG. 2 is a top view of an embodiment of the disclosure.

FIG. 3 is a front view of an embodiment of the disclosure.

FIG. 4 is a back view of an embodiment of the disclosure.

DESCRIPTION OF THE PREFERRED EMBODIMENT

Figure 5:
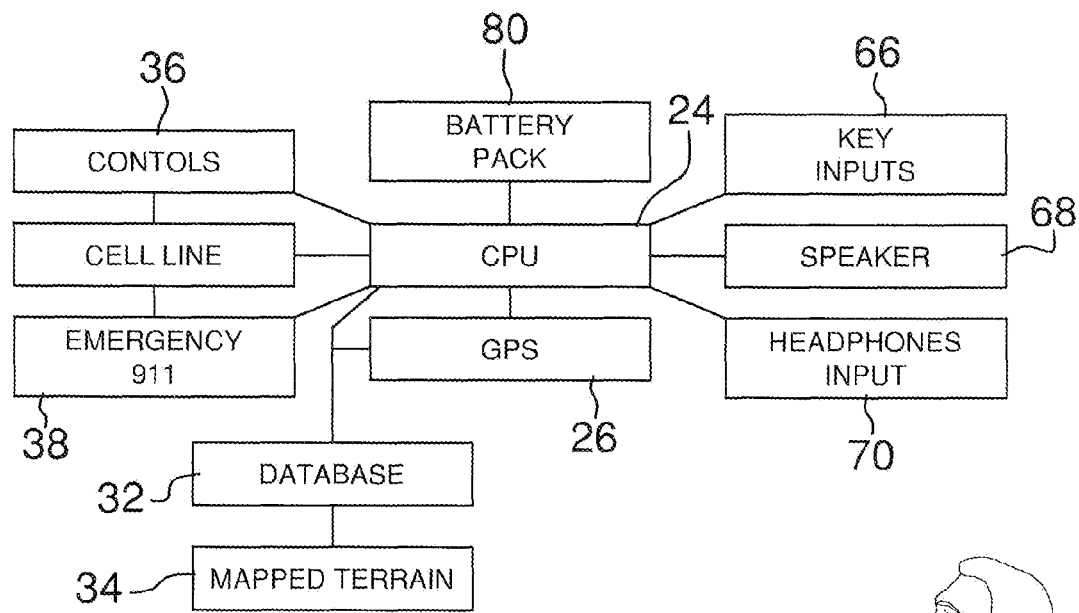
FIG. 5 is a schematic block diagram of an embodiment of the disclosure.
Figure 6:
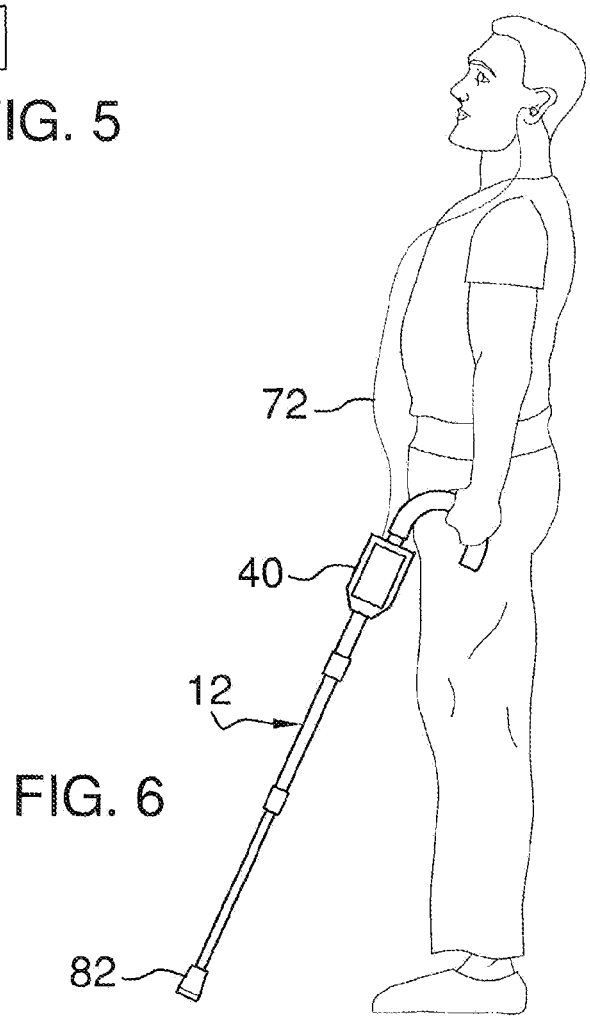
FIG. 6 is a front view of an embodiment of the disclosure in use.

With reference now to the drawings, and in particular to FIGS. 1 through 6 thereof, a new walking device embodying the principles and concepts of an embodiment of the disclosure and generally designated by the reference numeral 10 will be described.

As best illustrated in FIGS. 1 through 6, the assisted walking device 10 generally comprises an elongated shaft 12. The shaft 12 comprises a first portion 14, a second portion 16, and a third portion 18 wherein the second portion 16 extends between the first portion 14 and the third portion 18. The shaft 12 may be telescopic wherein the second portion 16 extends into and out of the first portion 14 and the third portion 18 extends into and out of the second portion 16. The shaft 12 may be made from metal, fiberglass, plastic, graphite, or the like. A handle 20 is coupled to the shaft 12. The handle 20 is coupled to and extends outwardly from a first end 22 of the first portion 14. The handle 20 is preferably arcuate and configured for manual grasping by a user. The first portion 14 of the shaft 12 is coupled to the handle 20. The third portion 18 of the shaft 12 is positioned distally relative to the handle 20.

A processor 24 is mounted in the shaft 12. A global positioning system ("GPS") 26 is electrically coupled to the processor 24 wherein the GPS 26 is configured to provide orientation and directional data to the processor 24. The GPS 26 comprises a transmitter 28 and a receiver 30. A database 32 having a mapped terrain 34 is provided. The database 32 is operationally coupled to the GPS 26 and the processor 24 wherein the processor 24 compares the mapped terrain 34 to the orientation and directional data provided by the GPS 26. In this manner, the processor 24 determines which obstacles, if any, are associated with the data provided by the GPS 26. Obstacles determined by the processor 24 include stop lights, stairwells, and the like. A control 36 may be operationally coupled to the GPS 26 and the processor 24 wherein selectively manipulating the control 36 causes the transmitter 28 to transmit an emergency signal to an emergency telephone operator 38.

A panel 40 is mounted to the shaft 12. The panel 40 may be coupled to a top side 42 of the shaft 12. The panel 40 comprises a front side 44 opposite a back side 46 and a first side 48 opposite a second side 50. Each of the first 48 and second 50 sides has an angled portion 52 extending inwardly toward the shaft 12. The panel 40 further comprises a first medial portion 54 extending between each of the angled portions 52 and a second medial portion 56 extending between each of the first 48 and second 50 sides of the panel 40 and positioned distally relative to the first medial portion 54. An input actuator 58 is coupled to the panel 40 and may be positioned on the front side 44 of the panel 40. The input actuator 58 is preferably spaced from the first 48 and second 50 sides of the panel 40. The input actuator 58 is electrically coupled to the processor 24 and the GPS 26 and is actuated to selectively choose a destination point. The input actuator 58 preferably comprises a keyboard 62 configured to allow a user to type a location name wherein the GPS 26 guides the user to the destination point when the location name is typed onto the keyboard 62. The keyboard 62 may comprise a plurality of raised bumps 64 positioned on one of a plurality of keys 66 wherein the bumps 64 represent Braille characters configured to assist a visually impaired user with typing the location name. The keys 66 are preferably arranged such that the relative location of each of the keys 66 corresponds to the location of the keys on a standard keyboard.

A speaker 68 is electrically coupled to the processor 24 and the GPS 26 wherein the speaker 68 is configured to transmit as voice messages the data from the GPS 26 and the corresponding data from the database 32. An earphone port 70 may be positioned in the second medial portion 56 of the panel 40. The earphone port 70 is electrically coupled to the processor 24 wherein the earphone port 70 is configured to transfer sound to a pair of earphones 72 when the earphones 72 are coupled to the earphone port 70.

An on/off control 74 is mounted to the panel 40 and may be positioned on the second medial portion 56 of the panel 40. The on/off control 74 is electrically coupled to the processor 24 wherein manipulation of the on/off control 74 turns the processor 24 on and off. A compartment 76 extends into the panel 40 and may be positioned on the second side 50 and the back side 46 of the panel 40. A power source 78 is mounted in the panel 40 wherein the power source 78 comprises a battery 80. The battery 80 is electrically coupled to the processor 24 wherein the battery 80 is configured to deliver power to the processor 24 when the battery 80 is positioned in the compartment 76.

An end cap 82 is coupled to the shaft 12. The end cap 82 is positioned on a bottom end 84 of the third portion 18 wherein the end cap 82 is configured to provide traction and support a user when the weight of the user is shifted onto the shaft 12 and the end cap 82 is pressed against a ground surface. The end cap 82 preferably tapers outwardly from a top 86 to a bottom 88 of the end cap 82. The end cap 82 is preferably constructed from rubber material. A plurality of couplers 90 is coupled to the shaft 12. One of the couplers 90 couples the first portion 14 and the second portion 16 of the shaft 12. One of the couplers 90 couples the second portion 16 and the third portion 18 of the shaft 12. One of the couplers 90 couples the panel 40 and the first portion 14 of the shaft 12.

In use, as stated above and shown in the Figures, the weight of the user is shifted onto the shaft 12 and the end cap 82 is abutted against the ground surface. A user types a location name onto the keyboard 62, and the GPS 26 guides the user to the destination point. The processor 24 compares the mapped terrain 34 to the orientation and directional data provided by the GPS 26. In this manner, the processor 24 determines which obstacles, if any, are associated with the data provided by the GPS 26. Obstacles determined by the processor 24 include stop lights, stairwells, and the like. The speaker 68 transmits as voice messages the data from the GPS 26 and the comparison data from the database 32 so that the user is guided to the destination point while also being warned of obstacles along the way. Earphones 72 positioned in the earphone port 70 permit a user to listen to the voice messages through the earphones 72. A user manipulates the control 36 to transmit an emergency signal to an emergency telephone operator 38. The shaft 12 telescopes to accommodate various heights of users while also facilitating storage of the shaft 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An assisted walking device comprising:
   an elongated shaft,
      said elongated shaft comprising a first portion, a second portion, and a third portion wherein said second portion extends between said first portion and said third portion,
      said elongated shaft being telescopic wherein said second portion extends into and out of said first portion and said third portion extends into and out of said second portion;
   a handle coupled to said elongated shaft,
      said handle being coupled to and extending outwardly from a first end of said first portion,
      said handle being arcuate wherein said handle is configured for manual grasping by a user,
      said third portion being positioned distally relative to said handle;
   a processor mounted in said elongated shaft;
   a global positioning system being electrically coupled to said processor wherein said global positioning system is configured to provide orientation and directional data to said processor,
      said global positioning system comprising a transmitter and a receiver;
   a database having a mapped terrain,
      said database being operationally coupled to said global positioning system and said processor wherein said processor compares said mapped terrain to the orientation and directional data provided by said global positioning system;
   a control operationally coupled to said global positioning system and said processor wherein selectively manipulating said control causes said transmitter to transmit an emergency signal to an emergency telephone operator;
   a panel mounted to said elongated shaft,
      said panel being coupled to a top side of said elongated shaft,
      said panel comprising a front side opposite a back side and a first side opposite a second side, each of said first and second sides having an angled portion extending inwardly toward said elongated shaft,
      said panel further comprising a first medial portion extending between each of said angled portions and a second medial portion extending between each of said first and second sides of said panel and positioned distally relative to said first medial portion;
   an input actuator being coupled to said panel,
      said input actuator being positioned on said front side of said panel,
      said input actuator being spaced from said first and second sides of said panel,
      said input actuator being electrically coupled to said processor and said global positioning system,
      said input actuator being actuated to selectively choose a destination point,
      said input actuator comprising a keyboard configured to allow a user to type a location name wherein said global positioning system guides the user to the destination point when the location name is typed onto said keyboard,
      said keyboard comprising a plurality of raised bumps positioned on one of a plurality of keys wherein said plurality of raised bumps represent Braille characters configured to assist a visually impaired user with typing the location name, said plurality of keys being arranged such that the relative location of each of said plurality of keys corresponds to the location of said plurality of keys on a standard keyboard;

a speaker being electrically coupled to said processor and said global positioning system wherein said speaker is configured to transmit as voice messages the data from said global positioning system and the corresponding data from said database;

an earphone port positioned in said second medial portion of said panel, said earphone port being electrically coupled to said processor wherein said earphone port is configured to transfer sound to a pair of earphones when the earphones are coupled to said earphone port;

an on/off control mounted to said panel, said on/off control being positioned on said second medial portion of said panel, said on/off control being electrically coupled to said processor wherein manipulation of said on/off control turns said processor on and off;

a compartment extending into said panel, said compartment being positioned on said second side and said back side of said panel;

a power source mounted in said panel wherein said power source comprises a battery, said battery being electrically coupled to said processor wherein said battery is configured to deliver power to said processor when said battery is positioned in said compartment;

an end cap coupled to said shaft, said end cap being positioned on a bottom end of said third portion wherein said end cap is configured to provide traction and support a user when the weight of the user is shifted onto said shaft and said end cap is pressed against a ground surface, said end cap tapering outwardly from a top to a bottom of said end cap; and a plurality of couplers being coupled to said shaft, one of said couplers coupling said first portion and said second portion of said shaft, one of said couplers coupling said second portion and said third portion of said shaft, one of said couplers coupling said panel and said first portion of said shaft.

\* \* \* \* \*